(12) United States Patent
Berman et al.

(10) Patent No.: US 6,938,072 B2
(45) Date of Patent: Aug. 30, 2005

(54) METHOD AND APPARATUS FOR MINIMIZING INCONSISTENCY BETWEEN DATA SOURCES IN A WEB CONTENT DISTRIBUTION SYSTEM

(75) Inventors: Steven M. Berman, Pittsburgh, PA (US); Thirumale Niranjan, Pittsburgh, PA (US); Srikanth Ramamurthy, Pittsburgh, PA (US); Sumanthkumar Sukumar, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 09/960,451

(22) Filed: Sep. 21, 2001

(65) Prior Publication Data

US 2003/0061298 A1 Mar. 27, 2003

(51) Int. Cl.[7] .............................................. G06F 13/00
(52) U.S. Cl. ....................... 709/214; 709/212; 709/223; 709/232
(58) Field of Search ............................... 709/214, 212, 709/223, 232, 319

(56) References Cited

U.S. PATENT DOCUMENTS

| 5,778,189 A | * | 7/1998 | Kimura et al. ............... 709/236 |
|---|---|---|---|
| 6,108,703 A | * | 8/2000 | Leighton et al. ............. 709/226 |
| 6,349,297 B1 | * | 2/2002 | Shaw et al. ..................... 707/4 |
| 6,611,348 B1 | * | 8/2003 | Chase et al. ................ 358/1.15 |
| 6,611,349 B1 | * | 8/2003 | Vogt et al. .................. 358/1.15 |
| 2001/0035814 A1 | * | 11/2001 | Uchida ........................ 340/5.74 |
| 2002/0026512 A1 | * | 2/2002 | Nishimura et al. ......... 709/226 |
| 2002/0131072 A1 | * | 9/2002 | Jackson ..................... 358/1.15 |
| 2002/0194468 A1 | * | 12/2002 | Betts-LaCroix et al. ..... 713/100 |
| 2003/0004998 A1 | * | 1/2003 | Datta ......................... 707/513 |
| 2003/0061372 A1 | * | 3/2003 | Agarwalla et al. .......... 709/232 |
| 2003/0135511 A1 | * | 7/2003 | Anderson et al. ........... 707/101 |
| 2003/0231168 A1 | * | 12/2003 | Bell et al. ................... 345/173 |

FOREIGN PATENT DOCUMENTS

JP          1 187 048 A2  *  3/2002

* cited by examiner

Primary Examiner—Reba I. Elmore
(74) Attorney, Agent, or Firm—Duke W. Yee; Jerry W. Herndon; Theodore D. Fay, III

(57) ABSTRACT

A method, apparatus and computer implemented instructions for minimizing inconsistency between a set of data sources in a data processing system. A first signal is sent indicating that new content is present for the set of data sources. The new content is transmitted to the set of data sources in which the new content is unavailable for distribution by the set of data sources until a second signal is received by the set of data sources. The second signal is sent to the set of data sources if an acknowledgment is received from all of the sets of data sources.

75 Claims, 3 Drawing Sheets

METHOD AND APPARATUS FOR MINIMIZING INCONSISTENCY BETWEEN DATA SOURCES IN A WEB CONTENT DISTRIBUTION SYSTEM

CROSS REFERENCE TO RELATED APPLICATIONS

The present invention is related to an application entitled Method and Apparatus for Caching Subscribed and Non-Subscribed Content in a Network Data Processing System, Ser. No. 09/960,448, filed even date hereof, assigned to the same assignee, and incorporated herein by reference.

BACKGROUND OF THE INVENTION

1. Technical Field

The present invention relates generally to an improved data processing system, in particular to a method and apparatus for processing data. Still more particularly, the present invention provides a method, apparatus, and computer implemented instructions for distributing web content and minimizing inconsistencies between data sources.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Content distribution systems are employed by businesses and entities delivering content, such as Web pages or files to users on the Internet. Currently, content providers will set up elaborate server systems or other types of data sources to provide content to various users. Web content distribution systems are those systems that are employed to distribute content to these servers and caches. This type of setup includes various nodes that act as sources of data. In this type of content distribution scheme, data from a primary or publishing node is propagated to all of the other nodes in the system. These types of systems require maintenance in addition to being expensive to put in place.

When a node within the system receives a notification that content is being propagated, the node pulls the data from a server or other data source and makes the data available to external clients requesting the data. In an ideal situation, accesses by clients are coordinated with the modification of the data at the various nodes in the system or a client always pulls data from a single node. In this situation, the data read by a single external client is guaranteed to be internally consistent.

Unfortunately, the ideal situation is currently unachievable because central coordination between external clients, nodes such as Web servers and caches, are not practical when scalability and performance are important. Further, different nodes may have dissimilar rates of data retrieval from Web servers and external clients cannot be blocked to ensure the node with the slowest connection to its data server becomes consistent with other nodes without a degradation of performance. Additionally, with the use of one or more load balancers between a client and a data source, a client may receive the same data from two different servers depending on network conditions.

Therefore, it would be advantageous to have an improved method, apparatus, and computer implemented instructions for distributing content and minimizing inconsistency between data sources.

SUMMARY OF THE INVENTION

The present invention provides a method, apparatus and computer implemented instructions for minimizing inconsistency between a set of data sources in a data processing system. A first signal is sent indicating that new content is present for the set of data sources. The new content is transmitted to the set of data sources in which the new content is unavailable for distribution by the set of data sources until a second signal is received by the set of data sources. The second signal is sent to the set of data sources if an acknowledgment is received from all of the sets of data sources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
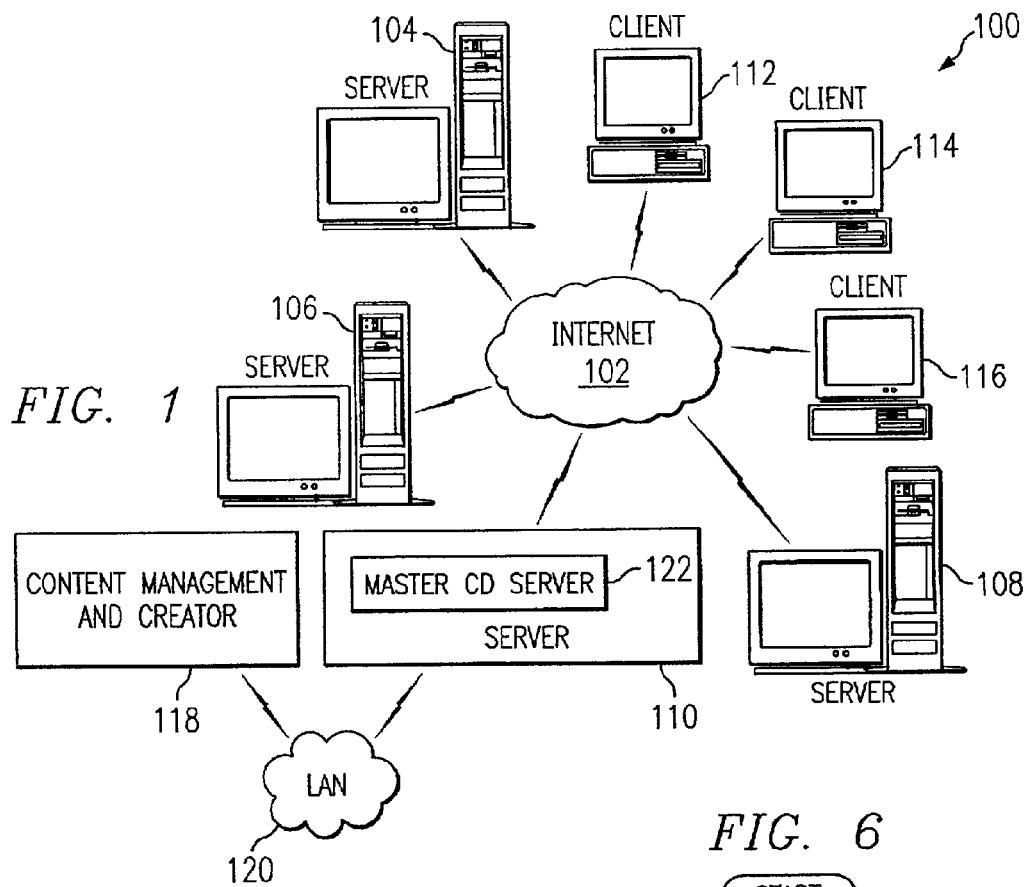
FIG. 1 is a network data processing system in accordance with a preferred embodiment of the present invention.

With reference now to the figures and in particular to FIG. 1, a network data processing system is depicted in accordance with a preferred embodiment of the present invention. Network data processing system 100 in this example includes network 102, which interconnects servers 104, 106, 108 and 110. These servers provide content to clients, such as clients 112, 114, and 116, through network 102. In this example, network 102 takes the form of the Internet.

Servers 104–110 are servers within a Web content distribution system. This system also includes content management and creator 118, which is connected to server 110 by local area network (LAN) 120. This Web content distribution system is also referred to as a content distribution framework and is an example of a system in which inconsistency between data and data sources is minimized, such as servers 104–108. In this example, server 110 functions as a primary publishing node while servers 104–108 serve as data sources to provide content to users making requests. Server 110 includes a master content distribution server and a master content distribution (CD) server process 122. Master content distribution server process 122 accepts notifications of new, deleted, or modified content from content management and creator 118. These notifications are propagated to servers 104–108, which then can invalidate or pull updated content from various sources. The content may be pulled from server 110 or from other sources. Typically, when a content publisher issues a notification to master CD server 122 in server 110, an identification of a staging server containing the content is made. Each of the servers pulling content includes a content distribution process (not shown), which will update content on a server when a notification is received.

This framework may be used to distribute multiple content types. For example, the framework may be used to move static content. Additionally, the framework may be used to publish or present documents on Web sites. In this instance, the framework will send notifications to the various nodes from the publishing node. The framework takes up the responsibility of updating the various repositories. Next, the framework may be used to move applications to the nodes for distribution and use. Third, the framework may be used to manage cached dynamic content. Finally, the framework may be used to distribute media files. Media files are similar to static pages. However, their large size requires a slightly different treatment. The transport mechanism in the framework may include mechanisms to pace the data distribution depending on factors such as the media type, the bandwidth requirements, and available bandwidth.

The present invention provides a method, apparatus, and computer implemented instructions for managing content within this type of framework. In particular, the present invention provides a mechanism for minimizing the window of inconsistency between data sources as well as describing a framework for providing content distribution to clients who create content, but do not necessarily desire to set up or maintain a content distribution system.

Content distribution services may be provided using this architecture by basing business contracts on guaranteeing a level of service. This level of service may include one or more of the following: bandwidth, storage, freshness or management. In these examples, bandwidth is the certified distribution bandwidth between internal nodes and out to remote clients. Storage is the amount of continuously available storage on current media. Freshness is the assurance that all content served will be up-to-date with respect to its origin. Management is the provision of management tools to manipulate the distribution parameters and locations.

With the terms of a contract in place to establish these parameters for service, the service provider and their customers both have a certain limitation in their ability to enforce the contract.

In these examples, content owners, the customers, may be required to establish at least one (edge) server with the content they wish to distribute available to the service provider with the content distribution system. At least one server is designated to handle the content bundles that the owner wishes to distribute. Once the subscription mapping is in place, the content updates are automatically sent to the distribution network. Monitoring nodes may be used to detect the freshness of the content being served and to report the success rate of content updates to the administrators.

The framework may employ a content distribution system to migrate or replicate Internet content to remote servers according to a predetermined schedule, or other automatically generated criteria. A rule based system or a dynamic use-analysis feedback system can automatically replicate the currently "hot" assets to more and more external caches if they reside within the system's administrative domain or within the domain of a cooperating CDSP. Whenever content becomes "important" for either popularity or other reasons, it can be migrated out to the replica sites automatically under program control.

Figure 2:
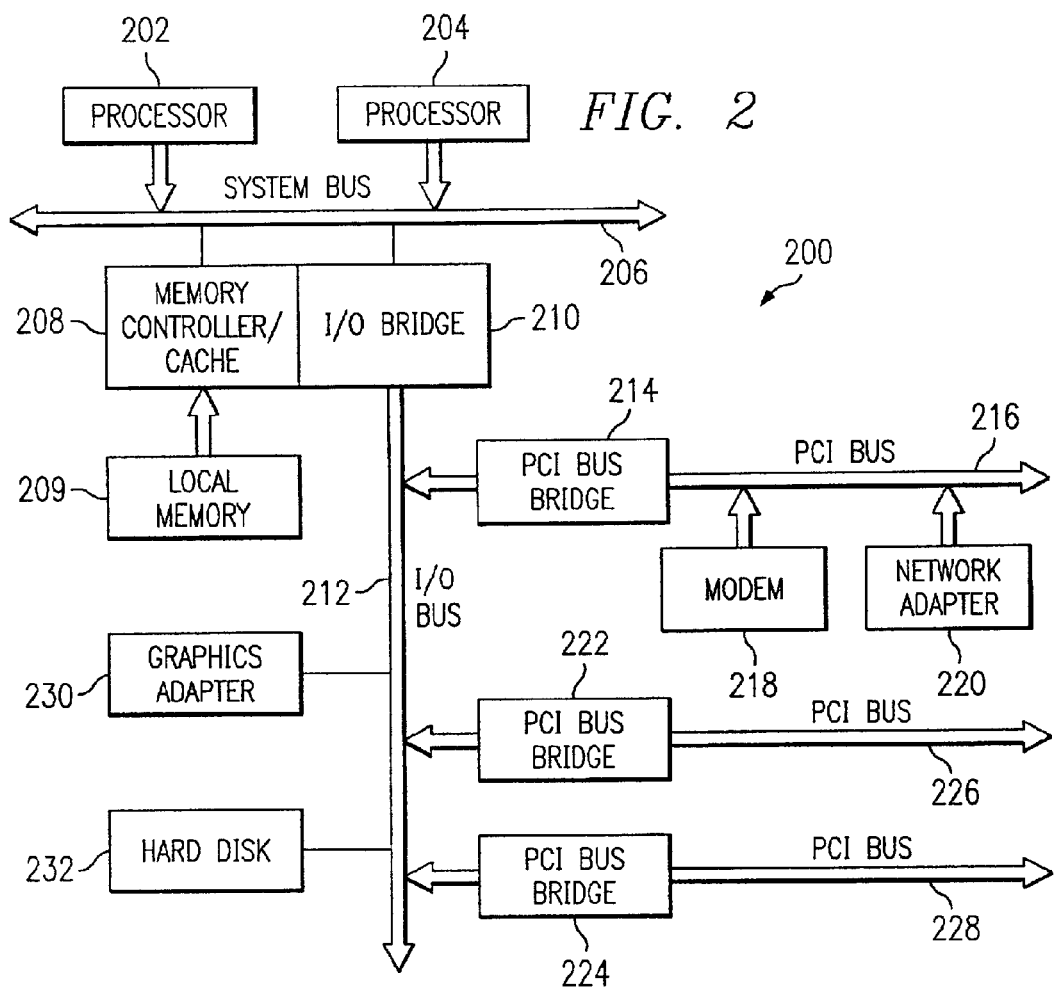
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Within the updating and distribution of content the present invention also includes a mechanism for minimizing windows of inconsistency between the different data sources. In particular, the present invention provides a method, apparatus, and computer implemented instructions for minimizing the window of inconsistency between data sources, such as, web caches or web servers, by distributing notifications of updates in a two-phase manner. The two phases ensure that fresh content is made live at roughly the same time at all caches and servers. In these examples, the mechanism is implemented in a content distribution system that provides a notification, which results in a pulling of the data to the data sources. Of course, this mechanism may also be implemented in systems that push data to data sources. In each case, the data is made available to requestors when all of the data sources contain the updated content.

The mechanism of the present invention is performed without requiring a central coordinator to arbitrate client browser requests and notifications. In other words, client requests go straight to the caches and servers, and the clients see consistent data across the nodes. This process is performed without requiring that external clients wait until the nodes become consistent with each other. The mechanism of the present invention will disconnect nodes that are unable to update content without requiring other nodes to roll back or use old content. During the whole two-phase process, a node can serve out old content, maintaining high availability.

Figure 3:
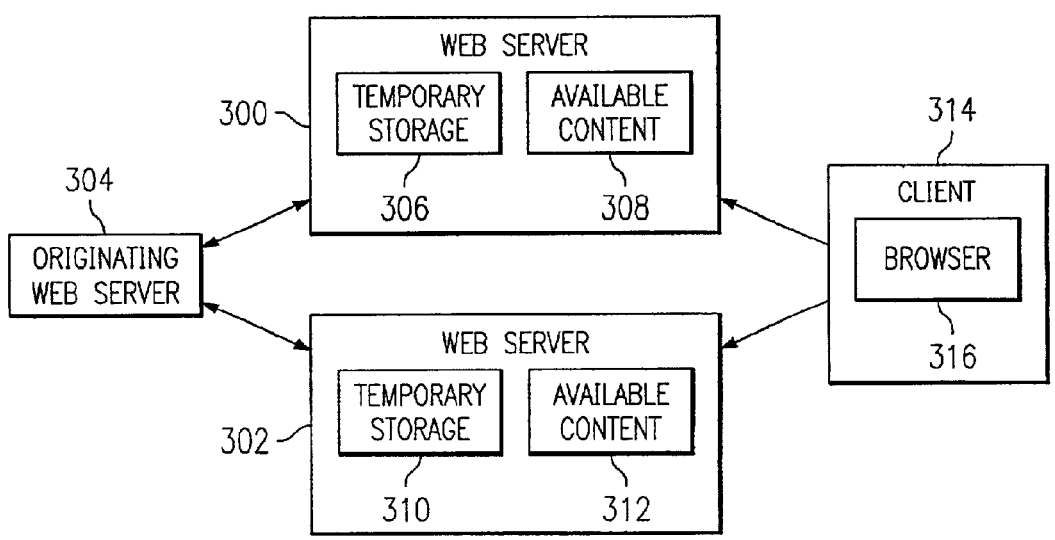
FIG. 3 is a diagram illustrating data flow in updating content at data sources in accordance with a preferred embodiment of the present invention.

With reference now to FIG. 3, a diagram illustrating data flow in updating content at data sources is depicted in accordance with a preferred embodiment of the present invention. In this example, content at Web server 300 and Web server 302 is updated from content located at originating Web server 304. These servers are servers in a Web content distribution system such as that illustrated in FIG. 1.

Web server 300 includes temporary storage 306 and available content 308. Similarly, Web server 302 includes temporary storage 310 and available content 312.

When a user requests content from a client, such as client 314, the request is typically made from a browser, such as browser 316. The request may be routed to either Web server 300 or Web server 302 through a load balancing system. If Web server 300 receives the request, the content returned to client 314 is returned from content in available content 308. This content may be, for example, a Web page or an audio file. If the request is routed to Web server 302, the content is returned to client 314 from content in available content 312. In either case, the content is identical.

At some point, changes to the content in available content 308 and available content 312 may be made. For example, a new Web page may be added, a Web page may be modified, or a Web page may be deleted from the content. The initiation of this process occurs when a signal indicating that content is to be updated is received by Web server 300 and Web server 302. This signal is received from originating Web server 304 in this example. In these examples, Web server 300 and Web server 302 pull the content from originating Web server 304. The content is stored in temporary storage 306 and temporary storage 310 during the pull process. When Web server 300 receives all of the new content, this Web server sends an acknowledgment signal back to originating Web server 304. Similarly, Web server 302 will transmit an acknowledgment signal to originating Web server 304 when Web server 302 has pulled all of the new content. The completion of the pulling of new content may occur at different times in Web server 300 and Web server 302 depending on the various network conditions, such as available bandwidth, network traffic, and the number of hops to originating Web server 304.

This content is not made available to clients until a second signal is received from originating Web server 304 indicating that the content is to be published or made available in response to request from clients. During this time, the content in available content 308 and available content 312 is used to reply to requests from clients.

In this manner, the content available at Web server 300 and Web server 302 is consistent. When the second signal is received, the content from temporary storage is placed into available content at each Web server. In this manner, the window of inconsistency between different servers is minimal. With the second signal being sent to Web server 300 and Web server 302 at the same time, the window of inconsistency between these two nodes is reduced significantly even if these two nodes have very different connection speeds. As a result, the content is made available at around the same time.

If Web server 300 does not pull all of the content from originating Web server 304 or is unable to return an acknowledgment signal, originating Web server 304 will disconnect Web server 300 and will send the second signal to Web server 302 after some period of time. This period of time is selected as one indicating that a server is malfunctioning or may be based on other factors, such as performance. This minimizing the window of inconsistency between data sources may be offered as part of a service for which a client is charged or billed.

Figure 4:
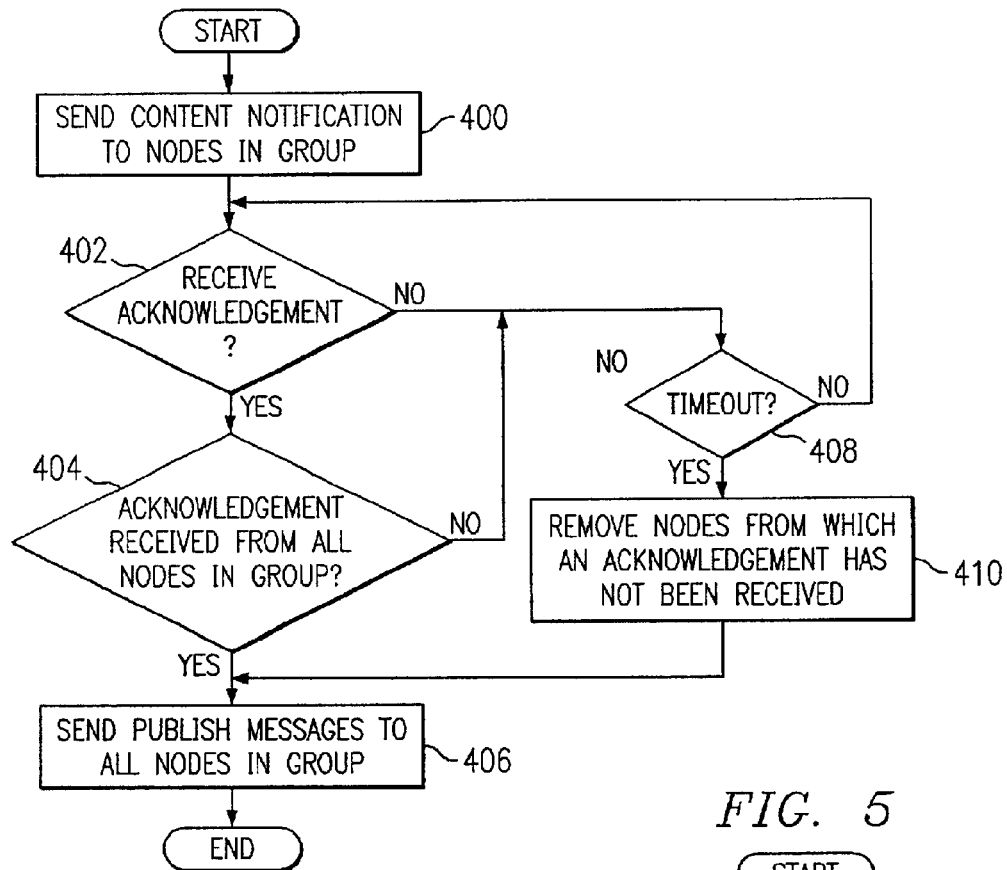
FIG. 4 is a flowchart of a process used for updating content in a content distribution system in accordance with a preferred embodiment of the present invention.

Turning next to FIG. 4, a flowchart of a process used for updating content in a content distribution system is depicted in accordance with a preferred embodiment of the present invention. The process illustrated in FIG. 4 may be implemented in an originating Web server, such as originating Web server 304 in FIG. 3.

The process begins by sending content notification to nodes in a group (step 400). A determination is made as to whether an acknowledgment has been received (step 402). An acknowledgment is returned from a node to the originating Web server when all of the content has been propagated to the node. If an acknowledgment has been received, a determination is then made as to whether an acknowledgment has been received from all nodes in the group (step 404). This step is used to determine if all of the nodes have received the new content. If an acknowledgment has been received by all nodes in the group, published messages are sent to all nodes in the group (step 406) with the process terminating thereafter. The published message causes the nodes to make the new content available in response to requests from users.

With reference again to step 404, if an acknowledgment has not been received by nodes in the group, a determination is made as to whether a timeout has occurred (step 408). The timeout period is set as a period of time after which an assumption is made that a node is malfunctioning or network conditions have made it impossible to return an acknowledgment. If a timeout has not occurred, the process returns to step 402. Otherwise, the nodes from which an acknowledgment has not been received are removed from the group (step 410) and the process proceeds to step 406 as described above. With reference again to step 402, if an acknowledgment is not received, the process also proceeds to step 408, as described above.

Figure 5:
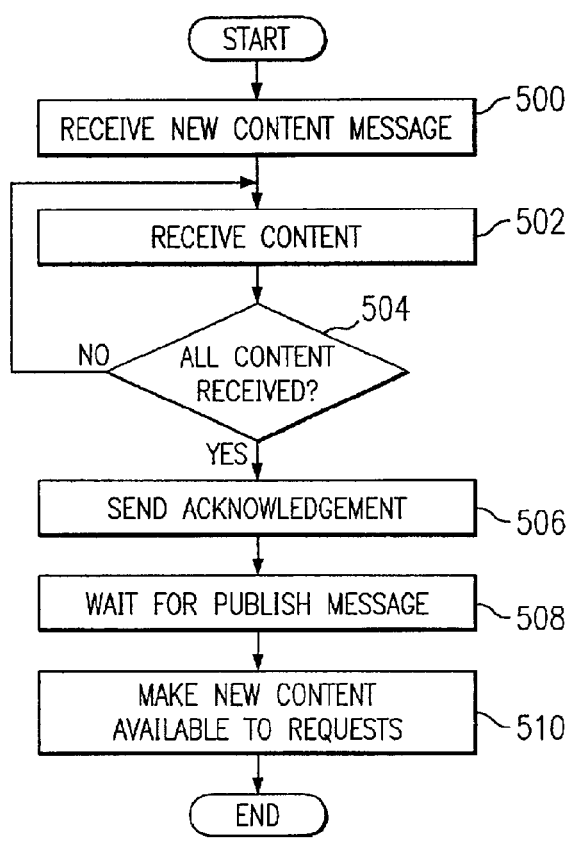
FIG. 5 is a flowchart of a process used for updating content in a data source in accordance with a preferred embodiment of the present invention.

Turning next to FIG. 5, a flowchart of a process used for updating content in a data source is depicted in accordance with a preferred embodiment of the present invention. The process illustrated in FIG. 5 may be implemented in a data source, such as Web server 300 in FIG. 3.

The process begins by receiving a new content message (step 500). Content is received (step 502). The content may be received by the data source pulling the content or from a push from a server originating the new content. A determination is then made as to whether all content has been received (step 504). If all content has been received, an acknowledgment is sent back to the server initiating the update (step 506). The process then waits for a publish message (step 508). After receiving the publish message, the new content is made available to requests (step 510) with the process terminating thereafter. During the time when the new content is unavailable in response to requests, the old content is used to respond to these requests.

Figure 6:
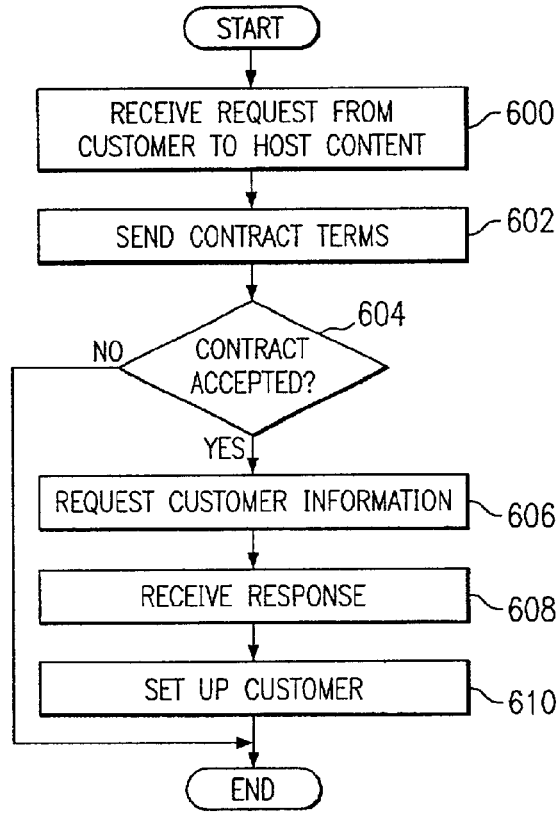
FIG. 6 is a flowchart of a process used for initiating a contract for providing content distribution services in accordance with a preferred embodiment of the present invention.

With reference now to FIG. 6, a flowchart of a process used for initiating a contract for providing content distribution services is depicted in accordance with a preferred embodiment of the present invention. The process illustrated in FIG. 6 may be implemented in a network data processing system, such as network data processing system 100 in FIG. 1.

The process begins by receiving a request to host content from a customer (step 600). This request may be made through selection of a link in a Web page. Contract terms are sent to the customer (step 602). These terms may include, for example, the quality of service that may be guaranteed, an identification of resources made available to the client, billing rates, content to be provided by the client, prohibited content, disclaimers, and other terms.

A determination is made as to whether the customer accepts the terms of the contract (step 604). If the customer rejects the terms of the contract, the process terminates. On the other hand, if the customer accepts the terms of the contract, customer information is requested (step 606). This customer information may include a user ID, a password, an IP address of a server from which the client will originate content, a billing address, and other contact information. A response is received from the customer (step 608), and the customer is set up to host content (step 610) with the process terminating thereafter.

Figure 7:
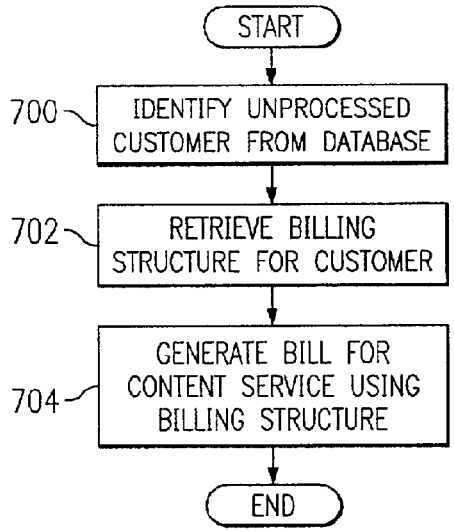
FIG. 7 is a flowchart of a process used for billing a customer in accordance with a preferred embodiment of the present invention.

Turning next to FIG. 7, a flowchart of a process used for billing a customer is depicted in accordance with a preferred embodiment of the present invention. The process illustrated in FIG. 7 may be implemented in a network data processing system, such as network data processing system 100 in FIG. 1.

The process begins by identifying an unprocessed customer from a database (step 700). Next, a billing structure for the customer is retrieved (step 702). Then, a bill is generated for content service using the billing structure (step 704) with the process terminating thereafter.

Thus, the present invention provides a method, apparatus, and computer implemented instructions for minimizing a window of inconsistency between data sources in a web content distribution system. The mechanism of the present invention minimizes the window by distributing content to data sources, but not allowing the data sources to publish or make the content available until all of the data sources have received the content. The mechanism of the present invention also allows for generating revenues for a content distribution system owner by allowing the content distribution system owner to provide services including the distribution of content to data sources and minimizing windows of inconsistency between data sources by billing clients for these services. In this manner, customers may have content published without having to incur the expenses of setting up or maintaining a content distribution system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for minimizing inconsistency between a set of data sources, the method comprising:

sending from an originating data source a first signal to the set of data sources indicating that new content is present for the set of data sources;

transmitting the new content to the set of data sources, wherein the new content is unavailable for distribution by the set of data sources until a second signal from the originating data source is received by the set of data sources; and sending the second signal from the originating data source to the set of data sources if the originating data source receives an acknowledgement signal from each data source in the set of data sources, wherein an acknowledgement signal comprises a signal indicating that a data source received the new content.

2. A method in a data processing system for minimizing inconsistency between a set of data sources, the method comprising:

sending from an originating data source a first signal to the set of data sources indicating that new content is present for the set of data sources;

transmitting the new content to the set of data sources, wherein the new content is unavailable for distribution by the set of data sources until a second signal from the originating data source is received by the set of data sources; and sending the second signal to each data source returning the acknowledgment after a period of time has passed without every data source in the set of data sources returning the acknowledgment.

3. The method of claim 2 further comprising:

removing a data source from the set of data sources if the data source fails to return the acknowledgment within the period of time.

4. The method of claim 1, wherein the first signal is a pull notification indicating that the new content will be pulled by the set of data sources.

5. The method of claim 1, wherein the second signal is a push notification indicating the new content will be transmitted to the set of data sources.

6. The method of claim 1, wherein the new content is an update to existing content located at the set of nodes data sources.

7. The method of claim 1, wherein the set of data sources includes at least one of a Web server and a data cache.

8. The method of claim 1 further comprising:

billing a set of clients for maintaining content at the set of data sources.

9. The method of claim 1 further comprising:

receiving the new content from a client based on a contract with the client to maintain content at the set of data sources.

10. The method of claim 1, wherein the first signal includes the content.

11. A method in a data processing system for providing content, the method comprising:

receiving from a server a first signal to obtain new content from the server;

receiving the new content after receiving the first signal;

storing the new content in a location in which the new content is unavailable to clients until a second signal is received;

sending an acknowledgment signal from the location and to the sewer after all of the new content is received;

sending the second signal from the server and to the location after the location sends the acknowledgement signal to the server, wherein the acknowledgement signal comprises a signal indicating that a location has received the new content; and making the new content available to clients in response to receiving the second signal.

12. The method of claim 11, wherein the content is received using a pull mechanism.

13. The method of claim 11, wherein the content is received using a push mechanism.

14. The method of claim 11, wherein the data processing system is one of a Web server and a data cache.

15. The method of claim 11 further comprising:

providing current content instead of new content if the second signal is not present.

16. A method in a data precessing system for providing content, the method comprising:

receiving new content from a customer;

transmitting the new content to a set of data sources, wherein the new content is unavailable for distribution by the set of data sources until a selected signal is received by the set of data sources; and sending the selected signal to the set of data sources if an acknowledgment is received from all of the set of data sources.

17. The method of claim 16, wherein the new content is a Web page.

18. The method of claim 16 further comprising:

billing the client for maintaining the content at the set of data sources.

19. The method of claim 16, wherein the set of data sources includes at least one of a Web server and a data cache.

20. A method in a data processing system for minimizing a window of inconsistency in data between a plurality of nodes, the method comprising:

sending a new content signal indicating that new content is present for the plurality of nodes;

monitoring for acknowledgments from the plurality of nodes; and responsive to receiving acknowledgments from all nodes within the plurality of nodes, sending a publish signal to the plurality of nodes, wherein the signal causes the plurality of nodes to make the new content available when the publish signal is received.

21. The method of claim 20 further comprising:

transmitting the new content to the plurality of nodes.

22. The method of claim 21, wherein the new content is pushed to the plurality of nodes.

23. The method of claim 20, wherein the new content is pulled by the plurality of nodes.

24. A data processing system comprising:

a bus system;

a communications unit connected to the bus system;

a memory connected to the bus system, wherein the memory includes a set of instructions; and a processing unit connected to the bus system, wherein the processing unit executes the set of instructions to send from an originating data source a first signal to the set of data sources indicating that new content is present for a set of data sources; transmit the new content to the set of data source; wherein the new content is unavailable for distribution by the set of data sources until a second signal from the originating data source is received by the set of data sources; and send the second signal to the set of data sources if the originating data source receives an acknowledgement signal from each data source in the set of data sources, wherein an acknowledgement signal comprises a signal indicating that a data source received the new content.

25. A data processing system comprising:
a bus system;
a communications unit connected to the bus system;
a memory connected to the bus system, wherein the memory includes a set of instructions; and
a processing unit connected to the bus system, wherein the processing unit executes the set of instructions to receive a first signal to obtain new content from a server; receive the new content after receiving the first signal; store the new content in a location in which the new content is unavailable to clients until a second signal is received; send an acknowledgment signal from the location and to the server after all of the new content is received; send the second signal from the server and to the location after the location sends the acknowledgement signal to the server, wherein the acknowledgement signal comprises a signal indicating that a location received the new content,
and make the new content available to clients in response to receiving the second signal.

26. A data processing system comprising:
a bus system;
a communications unit connected to the bus system;
a memory connected to the bus system, wherein the memory includes a set of instructions; and
a processing unit connected to the bus system, wherein the processing unit executes the set of instructions to receive new content from a customer; transmit the new content to a set of data sources, wherein the new content is unavailable for distribution by the set of data sources until a selected signal is received by the set of data sources; and send the selected signal to the set of data sources if an acknowledgment is received from all of the set of data sources.

27. A data processing system comprising:
a bus system;
a communications unit connected to the bus system;
a memory connected to the bus system, wherein the memory includes a set of instructions; and
a processing unit connected to the bus system, wherein the processing unit executes the set of instructions to said a new content signal indicating that new content is present for the plurality of nodes, monitor for acknowledgments from the plurality of nodes, and send a publish signal to the plurality of nodes in response to receiving acknowledgments from all nodes within the plurality of nodes, wherein the signal causes the plurality of nodes to make the new content available when the publish signal is received.

28. The data processing system of claim 27, wherein the new content is pushed to the plurality of nodes.

29. The data processing system of claim 27, wherein the new content is pulled by the plurality of nodes.

30. A data processing system for minimizing inconsistency between a set of data sources, the data processing system comprising:
first sending means for sending from an originating data source a first signal to the set of data sources indicating that new content is present for the set of data sources;
transmitting means for transmitting the new content to the set of data sources, wherein the new content is unavailable for distribution by the set of data sources until a second signal from the originating data source is received by the set of data sources; and
second sending means for sending the second signal to the set of data sources if the originating data source receives an acknowledgement signal from each data source in the set of data sources, wherein an acknowledgement signal comprises a signal indicating that a data source received the new content.

31. A data processing system for minimizing inconsistency between a set of data sources, the data processing system comprising:
first sending means for sending from an originating data source a first signal to the set of data sources indicating that new content is present for the set of data sources;
transmitting means for transmitting the new content to the set of data sources, wherein the new content is unavailable for distribution by the set of data sources until a second signal from the originating data source is received by the set of data sources; and
second sending means for sending the second signal to each data source returning an acknowledgment signal indicating that a data source has received the new content, said second signal sent after a period of time has passed without every data source in the set of data sources returning the acknowledgement signal.

32. The data processing system of claim 31 further comprising:
removing means for removing a data source from the set of data sources if the data source fails to return the acknowledgment signal within the period of time.

33. The data processing system of claim 30, wherein the first signal is a pull notification indicating that the new content will be pulled by the set of data sources.

34. The data processing system of claim 30, wherein the second signal is a push notification indicating the new content will be transmitted to the set of data sources.

35. The data processing system of claim 30, wherein the new content is an update to existing content located at the set of data sources.

36. The data processing system of claim 30, wherein the set of data sources includes at least one of a Web server and a data cache.

37. The data processing system of claim 30 farther comprising:
billing means for billing a set of clients for maintaining content at the set of data sources.

38. The data processing system of claim 30 further comprising:
receiving means for receiving the new content from a client based on a contract with the client to maintain content at the set of data sources.

39. The data processing system of claim 30, wherein the first signal includes the content.

40. A data processing system for providing content, the data processing system comprising:
first receiving means for receiving a first signal from a server to obtain new content from a the server;
second receiving means for receiving the new content after receiving the first signal;
storing means for storing the new content in a location in which the new content is unavailable to clients until a second signal is received;
sending means for sending an acknowledgment signal from the location and to the server alter all of the new content is received;
wherein the second signal is sent from the server and to the location after the location sends the acknowledgement signal to the server, wherein the acknowledgement signal comprises a signal indicating that a location received the new content; and making means for making the new content available to clients in response to receiving the second signal.

41. The data processing system of claim 40, wherein the content is received using a push mechanism.

42. The data processing system of claim 40, wherein the content is received using a push mechanism.

43. The data processing system of claim 40, wherein the data processing system is one of a Web server and a data cache.

44. The data processing system of claim 40 further comprising:

providing means for providing current content instead of new content if the second signal is not present.

45. A data processing system for providing content, data processing system comprising:

receiving means for receiving new content from a customer;

transmitting means for transmitting the new content to a set of data sources, wherein the new content is unavailable for distribution by the set of data sources until a selected signal is received by the set of data sources; and sending means for sending the selected signal to the set of data sources if an acknowledgment is received from all of the set of data sources.

46. The data processing system of claim 45, wherein the new content is a Web page.

47. The data processing system of claim 45 further comprising:

billing means for billing the client for maintaining the content at the set of data sources.

48. The data processing system of claim 45, wherein the set of data sources includes at least one of a Web server and a data cache.

49. A data processing system for minimizing a window of inconsistency in data between a plurality of nodes, the data processing system comprising:

sending means for sending a new content signal indicating that new content is present for the plurality of nodes;

monitoring means for monitoring for acknowledgments from the plurality of nodes; and sending means, responsive to receiving acknowledgments from all nodes within the plurality of nodes, sending a publish signal to the plurality of nodes, wherein the signal causes the plurality of nodes to make the new content available when the publish signal is received.

50. The data processing system of claim 49 further comprising:

transmitting means for transmitting the new content to the plurality of nodes.

51. The data processing system of claim 50, wherein the new content is pushed to the plurality of nodes.

52. The data processing system of claim 49, wherein the new content is pulled by the plurality of nodes.

53. A computer program product in a computer readable medium for minimizing inconsistency between a set of data sources, the computer program product comprising:

first instructions for sending from an originating data source a first signal to the set of data sources indicating that new content is present for the set of data sources;

second instructions for transmitting the new content to the set of data sources, wherein the new content is unavailable for distribution by the set of data sources until a second signal from the originating data source is received by the set of data sources; and third instructions for sending the second signal to the set of data sources if the originating data source receives an acknowledgement signal from each data source in the set of data sources, wherein an acknowledgement signal comprises a signal indicating that a data source received the new content.

54. A computer program product in a computer readable medium for minimizing inconsistency between a set of data sources, the computer program product comprising:

first instructions for sending from an originating data source a first signal to the set of data sources indicating that new content is present for the set of data sources;

second instructions for transmitting the new content to the set of data sources, wherein the new content is unavailable for distribution by the set of data sources until a second signal from the originating data source is received by the set of data sources; and third instructions for sending the second signal to each data source returning an acknowledgment signal indicating that a data source received the new content, wherein the second signal is sent after a period of time has passed without every data source in the set of data sources returning the acknowledgment.

55. The computer program product of claim 54 further comprising:

fourth instructions for removing a data source from the set of data sources if the data source fails to return the acknowledgment within the period of time.

56. The computer program product of claim 53, wherein the first signal is a pull notification indicating that the new content will be pulled by the set of data sources.

57. The computer program product of claim 53, wherein the second signal is a push notification indicating the new content will be transmitted to the set of data sources.

58. The computer program product of claim 53, wherein the new content is an update to existing content located at the set of data sources.

59. The computer program product of claim 53, wherein the set of data sources includes at least one of a Web server and a data cache.

60. The computer program product of claim 53 further comprising:

fourth instructions for billing a set of clients for maintaining content at the set of data sources.

61. The computer program product of claim 53 further comprising:

fourth instructions for receiving the new content from a client based on a contract with the client to maintain content at the set of data sources.

62. The computer program product of claim 53, wherein the first signal includes the content.

63. A computer program product in a computer readable medium for providing content, the computer program product comprising:

first instructions for receiving from a server a first signal to obtain new content from the server;

second instructions for receiving the new content after receiving the first signal;

third instructions for storing the new content in a location in which the new content is unavailable to clients until a second signal is received;

fourth instruction, for sending an acknowledgment from the location and to the server alter all of the new content is received;

filth instructions for sending the second signal from the server and to the location after the location sends the acknowledgement signal to the server, wherein the acknowledgement signal comprise; a signal indicating that a location received the new content; and sixth instructions for making the new content available to clients in response to receiving the second signal.

64. The computer program product of claim 63, wherein the content is received using a pull mechanism.

65. The computer program product of claim 63, wherein the content is received using a push mechanism.

66. The computer program product of claim 63, wherein the data processing system is one of a Web server and a data cache.

67. The computer program product of claim 63 further comprising:

seventh instructions for providing current content instead of new content if the second signal is not present.

68. A computer program product in a computer readable medium for providing content, the computer program product comprising:

first instructions for receiving new content from a customer;

second instructions for transmitting the new content to a set of data sources, wherein the new content is unavailable for distribution by the set of data sources until a selected signal is received by the set of data sources; and third instructions for sending the selected signal to the set of data sources if an acknowledgment is received from all of the set of data sources.

69. The computer program product of claim 68, wherein the new content is a Web page.

70. The computer program product of claim 68 farther comprising:

fourth instructions for billing the client for maintaining the content at the set of data sources.

71. The computer program product of claim 68, wherein the set of data sources includes at least one of a Web server and a data cache.

72. A computer program product in a computer readable medium for minimizing a window of inconsistency in data between a plurality of nodes, the computer program product comprising:

first instructions for sending a new content signal indicating that new content is present for the plurality of nodes;

second instructions for monitoring for acknowledgments from the plurality of nodes; and third instructions, responsive to receiving acknowledgments from all nodes within the plurality of nodes, sending a publish signal to the plurality of nodes, wherein the signal causes the plurality of nodes to make the new content available when the publish signal is received.

73. The computer program product of claim 72 further comprising:

fourth instructions for transmitting the new content to the plurality of nodes.

74. The computer program product of claim 73, wherein the new content is pushed to the plurality of nodes.

75. The computer program product of claim 72, wherein the new content is pulled by the plurality of nodes.

* * * * *

UNITED STATES PATENT AND TRADEMARK OFFICE
CERTIFICATE OF CORRECTION

PATENT NO. : 6,938,072 B2
DATED : August 30, 2005
INVENTOR(S) : Berman et al.

It is certified that error appears in the above-identified patent and that said Letters Patent is hereby corrected as shown below:

Column 9,
Line 60, after "to the" delete "sewer" and insert -- server --.

Column 10,
Line 57, after "data" delete "source;" and insert -- sources; --.

Column 11,
Line 41, after "instructions to" delete "said" and insert -- send --.

Column 12,
Line 41, after "claim 30" delete "farther" and insert -- further --.

Column 13,
Line 7, after "using a" delete "push" and insert -- pull --.

Column 14,
Line 65, after "fourth" delete "instruction," and insert -- instructions --.
Line 66, after "server" delete "alter" and insert -- after --.

Column 15,
Line 4, after "acknowledgement signal" delete "comprise;" and insert -- comprises --.

Signed and Sealed this

Twenty-first Day of February, 2006

JON W. DUDAS
*Director of the United States Patent and Trademark Office*